United States Patent
Shelton et al.

[11] Patent Number: 5,931,940
[45] Date of Patent: Aug. 3, 1999

[54] TESTING AND STRING INSTRUCTIONS FOR DATA STORED ON MEMORY BYTE BOUNDARIES IN A WORD ORIENTED MACHINE

[75] Inventors: Richard Shelton, Roseville; Peter B. Criswell, Bethel, both of Minn.

[73] Assignee: Unisys Corporation, Blue Bell, Pa.

[21] Appl. No.: 08/786,924

[22] Filed: Jan. 23, 1997

[51] Int. Cl.[6] .................................................. G06F 13/00
[52] U.S. Cl. ..................... 712/204; 712/220; 707/521
[58] Field of Search ................... 395/380, 898, 395/386, 561; 707/521

[56] References Cited

U.S. PATENT DOCUMENTS

| | | | |
|---|---|---|---|
| 4,755,955 | 7/1988 | Kimura et al. | 707/521 |
| 4,809,169 | 2/1989 | Sfarti et al. | 364/200 |
| 4,819,164 | 4/1989 | Branson | 364/200 |
| 4,947,411 | 8/1990 | Shiraishi et al. | 377/47 |
| 5,041,962 | 8/1991 | Lunsford | 364/200 |
| 5,051,894 | 9/1991 | Phillips et al. | 711/202 |
| 5,222,225 | 6/1993 | Groves | 395/842 |
| 5,335,289 | 8/1994 | Abdelazim | 382/177 |
| 5,392,244 | 2/1995 | Inoue | 395/800 |
| 5,495,592 | 2/1996 | James et al. | 711/212 |
| 5,550,972 | 8/1996 | Patrick et al. | 345/507 |
| 5,634,094 | 5/1997 | Ueda | 707/521 |
| 5,696,946 | 12/1997 | Patrick et al. | 345/513 |
| 5,790,821 | 8/1998 | Pflum | 395/376 |

*Primary Examiner*—Zarni Maung
*Attorney, Agent, or Firm*—Charles A. Johnson; Mark T. Starr; Nawrocki, Rooney & Sivertson, PA

[57] ABSTRACT

Apparatus and a method for providing a single instruction that can load a character from memory and perform a character compare. In an illustrative embodiment, this is accomplished by providing indexing apparatus which permits indexing on character boundaries. The characters are loaded from memory, and provided to an ALU unit in a processor, wherein a compare is made with a desired value. The ALU provides a compare result to a jump skip logic block, which notifies the processor whether the instruction immediately following the instruction of the present invention should be skipped or executed.

16 Claims, 9 Drawing Sheets

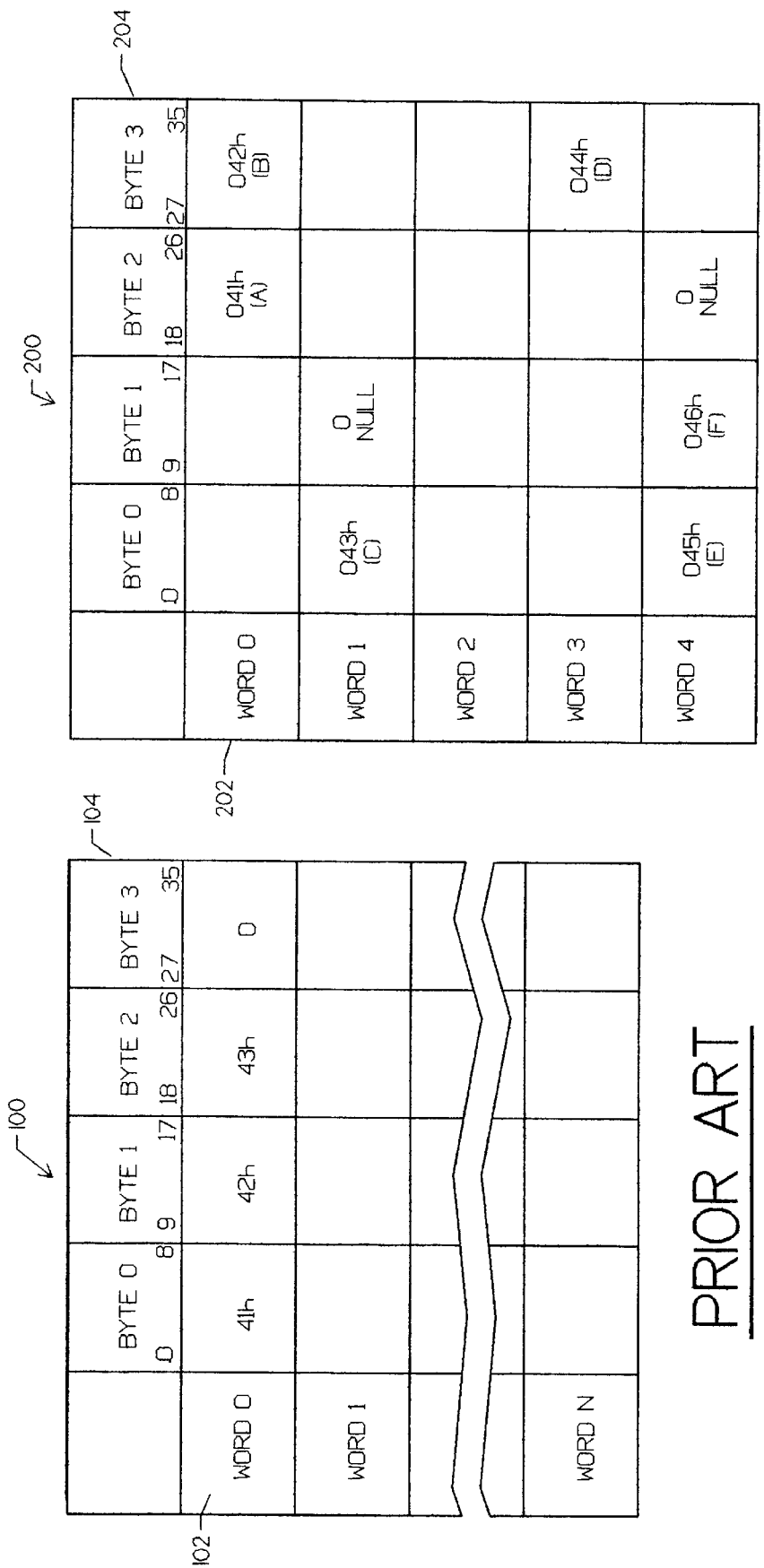

FIG. 6

TESTING AND STRING INSTRUCTIONS FOR DATA STORED ON MEMORY BYTE BOUNDARIES IN A WORD ORIENTED MACHINE

CROSS REFERENCES TO CO-PENDING APPLICATIONS

This application is related to U.S. patent application Ser. No. 08/777,517, filed on Dec. 27, 1996, entitled "Programmable Processor Execution Rate Controller" (RA-3436), assigned to the same assignee as the present invention, and which incorporated herein by reference.

BACKGROUND OF THE INVENTION

1. Field of the Invention

This invention relates to manipulating, storing and testing data in electronic data processing systems, and more particularly, relates to manipulating, storing and testing data in character format in word-oriented processing systems.

2. Description of the Prior Art

In the past, character oriented processors have manipulated data in character format. An example is the 68020 Motorola microprocessor which uses index auto-incrementation to step from one byte to an adjacent byte. An instruction which uses an address and points to a byte in memory is automatically incremented to the next byte for the next memory reference. While this system operates well with a byte-oriented system, this approach does not apply to a word-oriented processor.

In word-oriented processors, an entire word is typically read from memory, and the appropriate byte is selected therefrom. Thus, the addressing of a particular byte typically includes a word address and a byte address. Because a character string may cross a word boundary, the process of reading a string of characters from a memory can be more complex than in the byte-oriented processors.

Character string manipulation is a common operation in many of today's computer applications. Many string operations involve identifying or comparing characters within a string. This often involves comparing each character in a string to a known value, such as a null or zero value. In many word oriented processors, this is accomplished by sequentially loading each character into an arithmetic register, and then comparing the loaded character to a desired value. In most systems, the characters must also be right justified before the compare to properly align the corresponding bits. Thus, at least two instructions are typically required to compare each character of a string with a desired value. This can consume a considerable amount of computation time.

To improved the speed and efficiency of byte access instructions in a word oriented data processing system, a load string (LS) and store string (SS) instruction have previously been developed. The load string and store string instructions utilize an indexed addressing scheme that includes a bank address field, a word offset field and a bite offset field. The word offset field is typically added to the bank address field to identify a particular word within the addressed memory bank. The bit offset field is used to identify a particular byte within the addressed word. Often, a character length field is also provided for identifying the bit width of each character in the string.

Using this addressing scheme, the Load String and Store String instructions may auto-increment the address after each load, such that the next character in a string is automatically referenced, without having to use the arithmetic logic unit (ALU) of a processor. This is accomplished by providing dedicated hardware separate from the ALU of the processor for incrementing the bit offset field by the character width. If the bit offset field is incremented past a word boundary, the word offset field is incremented by one, and the bit offset field is adjusted by subtracting the word length. As indicated above, this index manipulation may occur automatically in the hardware.

While the LS and SS instructions greatly improve the performance of loading and storing characters within a word oriented processor, the often used task of loading and comparing characters to a desired value may still require two separate instructions; namely the load instruction (LS) and a character compare instruction. Thus, at least two instruction cycles are typically required for each character compare.

It would be desirable, therefore, to provide a single instruction that can load a character from memory, and perform a compare. This may significantly increase the performance of many string operations, and in particular, those string operations that identify a particular character or combination of characters.

SUMMARY OF THE INVENTION

According to the present invention, a system and method of operation is provided which provides a single instruction that can load a character from memory and perform a character compare. In an illustrative embodiment, this is accomplished by providing indexing apparatus which permits indexing on character boundaries, as described above. The characters are loaded from memory, and provided to an ALU unit in a processor, wherein a compare is made with a desired value. The ALU provides a compare result to a jump skip logic block, which notifies the processor whether the instruction immediately following the instruction of the present invention should be skipped or executed.

In a preferred embodiment, a test-not-equal-to-string (TNES) instruction and a test-equal-to-string (TES) instruction are provided. The TNES instruction skips the immediately following instruction if the character read from memory is not equal to the desired string or character. The TES instruction skips the immediately following instruction if the character read from memory is equal to the desired string or character. Both instructions load the appropriate character from memory, perform a compare of that character with a desired value, and determine whether a skip should occur. In addition, both instructions are processed during a single instruction cycle.

The TNES and TES instructions may load a word and select a byte from the word using an auto-indexing scheme, as described above. An accumulator register, which is coupled to an ALU, may also be provided and may be loaded with a desired result, for example a null or zero value. To align the selected byte with the desired result, it is contemplated that the selected byte may be right justified. This may be accomplished by using a shift register that has been adapted to provide the desired shifts. Depending on the bit offset and the character length, a conversion block may direct the shift register to perform the appropriate shift to properly right justify the loaded character. This may occur after the selected character is loaded from memory but before the compare is made by the ALU.

Finally, it is contemplated that the processor may be a pipelined instruction processor. In a pipelined instruction processor, the execution of each instruction is distributed over a number of pipeline stages. Each pipeline stage executes part of the instruction, and the results may be provided to a subsequent pipeline stage. To maximum performance, an instruction is often provided to the pipeline at each instruction cycle. Thus, a number of instructions are typically executed in parallel within the instruction pipeline, with each instruction at a different stage of execution. An advantage of a pipelined architecture is that each instruction may be executed over a number of clock cycles, but the effective rate at which the instructions are processed is one instruction per instruction cycle. As indicated above, and in the preferred embodiment, the TNES and TES instructions are completed in a single instruction cycle of a pipelined instruction processor.

As can readily be seen, the present invention may minimize both the number of instructions required and the response time when doing such typical string operations as testing one character against another for null conditions. Since such character comparisons are frequently required in character string manipulations, this may result in a considerable savings of processing time.

BRIEF DESCRIPTION OF THE DRAWINGS

FIG. 1 is table 100 of byte columns and word rows indicating character locations;

FIG. 2 is table 200 of byte columns and word rows indicating character locations;

FIG. 6 is a table showing the response of a J register to various shift commands;

DESCRIPTION OF THE PREFERRED EMBODIMENT

Figure 3:
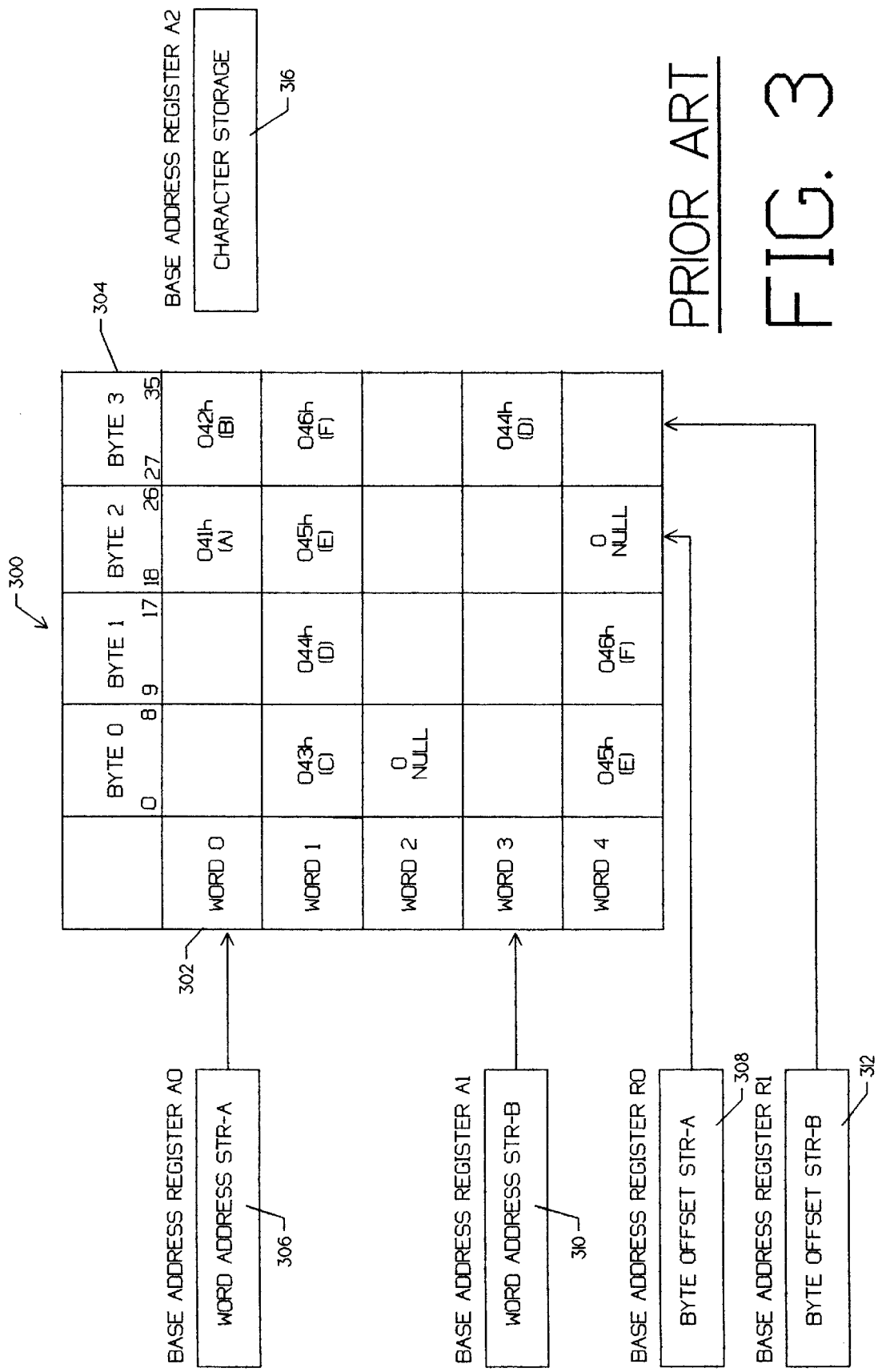
FIG. 3 is table 300 of byte columns and word rows indicating character locations.

Prior art word boundary processing systems have evolved generally as described below. A string concatenation instruction is the example chosen to illustrate the prior art of word boundary organized systems and to underscore the improvement provided by the present invention. A character string is a data structure which can be represented by a 1×N memory array in which each member of the array contains data representations of a single character. Generally, characters are represented using the industry-standard ASCII character code, wherein each character is represented by a unique 8-bit pattern. Using an ASCII code, each member of the array is a byte long.

Current processing systems often use high-level languages, such as C or Pascal. Prior to execution, a computer program written in these languages must be converted into a language that can be more readily understood by a computer, typically called an assembly language. This conversion is accomplished by a compiler.

The compiler is a computer program which replaces every high-level language instruction with a group of instructions written in assembly language code. This replacement, i.e., compiled, code performs the same function as designated in the high-level language instruction, but in assembly language code. Usually the original high-level instruction is replaced by a number of assembly language instructions.

The number of assembly language instructions required to perform a single high-level instruction varies considerably depending upon the task and the structure of the computer itself. A high-level instruction which compiles into a large number of assembly language instructions will execute more slowly because executing each instruction requires a certain number of clock cycles. In addition to substitution of a number of assembly language instruction for a single high-level instruction compiler, and if the compiled code is extensive, the compiler will substitute a function call into the main code body. A function call will place this extensive code into another storage area which is called whenever that function is required. These function calls, since they involve additional system overhead for addressing and recalling the code, require additional processing time.

Because of the nature of a compiler, it is desirable to minimize both the overall number of assembly language instructions which must be executed for each high-level language instruction, and the number of function calls. This can be accomplished by matching the computer structure as closely to the task as possible.

FIG. 1 shows a memory Bank 100 having an array of rows of words 102 versus columns of bytes 104. This illustrates the character string "ABC" as it would be stored in the memory of a computer system using ASCII code where A=41 hexadecimal (h), B=42h, and C=43h. Here, the characters 41h, 42h and 43h are stored in word 0 as byte 0, byte 1, and byte 2, respectively. As is typical in string notation, the strings are always terminated by a special character to permit users to locate the string end. Here, a C program is assumed which uses the "null" character to denote the end of an ASCII character string. As shown here, the ASCII null character (whose character name is NUL) is assigned the ASCII code "0", and is located in word 0 byte 3 to designate the end of string ABC.

As is evident from FIG. 1, character strings are usually associated with bytes of memory. It, therefore, follows that string operations are accomplished by assembly instructions which can perform memory operations on byte-boundaries. Historically, many commercially available mainframe systems were developed to process data stored on word, not byte, memory boundaries. As a result, the compiled assembly language code for a single string instruction can be long and complex.

FIG. 2 shows memory Bank 200 having an array of rows of words 202 versus columns of bytes 204 as they would be stored in ASCII code in the representative word oriented system. In this system, each word is 36-bits long and each byte is nine bits long permitting four bytes to be stored in each 36-bit word. Since an ASCII code is 8-bits long, one bit of the 9-bits available for data storage is zero filled, here the most significant bit of the byte. The ASCII codes are again hexadecimal. The first string is ABC with a null terminator, and the second string is DEF with a null terminator. In the first string A=041h, B=042h, C=043h, and Null=0. In the second string D=044h, E=045h, F=046h, and Null=0. The first string, ABC Null, occupies word 0 byte 2 and 3, and word 1 bytes 0 and 1, respectively. The second string, DEF Null, occupies word 3 byte 3, and word 4 bytes 0, 1 and 2, respectively. This illustrates that strings do not have to be stored on a word boundary.

Early systems used quarter word divisions. This is typified in the representative system which uses assembly language instructions called load quarter word (LAQW) and store quarter word (SAQW) to accomplish byte operations. To use these instructions, both the word address and the exact offset within the word were needed to address a quarter word byte. Since auto-indexing was not available for these instructions, a byte index and a word address counter was maintained for addressing purposes.

This is very cumbersome as is demonstrated by the following assembly code which is necessary to perform the C language string concatenate "strcat" instruction. This is illustrated using FIGS. 2 and 3. FIG. 3 shows memory Bank 300, including an array of rows of words 302 versus columns of bytes 304. In FIG. 3, string A is shown with the same word and byte position as string A in FIG. 2.

The instruction strcat (A,B) applied to string B with the word and byte locations of FIG. 2, results in the characters of string B, characters D, E and F of FIG. 2, being copied to new byte locations following string A, characters A, B and C in FIG. 3. The resulting concatenated string consists of A, B, C, D, E, F and Null in Word 0, Byte 2 and 3, Word 1, Byte 0, 1, 2 and 3 and Word 3 Byte 0, respectively. A null (0) character was added in the Word 3 Byte 0 location after the string B character F at word 2 byte 0 location to mark the end of the new concatenated string.

The following description illustrates the assembly code needed to perform "strcat" to move the characters shown in FIG. 2, namely string B characters D, E and F after string A characters A, B and C, using LAQW and SAQW instructions with the results shown in FIG. 3. This also shows Base Address Register A0 306, which gives the word location, Index Register R0 308, which indicates the A string byte offset within the word location, Register A1 310, which gives the String B word location, and Register R1 312, which gives the String B byte offset. These registers are actually provided by the General Register Set of the Instruction Processor.

The load quarter word instructions and corresponding explanations follow:

```
#1   Initialize: load base register A0 306 with the word
        location of String A, load Index Register R0
        308 with the String A offset, initial values
        for the present example being 0 and 2,
        respectively; load base register A1 310 with
        the word location of String B, load Index
        Register R1 312 with the String B offset,
        initial values for the present example being 3
        and 3, respectively.
{Find the end of String A}
#2   LAQW (R0,A0),A2 (load arithmetic register A2 316
        with the value of the character pointed to by the
        word index A0 and the byte offset R0; in the
        present example 041h).
        Compare: Loaded value in A2 = Null? (null
        indicates the end of string A)
          No:   (not end of string A, continue)
                R0 = R0 + 1 (increment Index Register R0
                    308 to next byte)
                R0 >3?   (incremented past a word
                         boundary?)
                  No:  Go to #2 to obtain next string
                       A character
                  Yes: (adjust index and word address)
                       R0 = 0 (reset Index Register 308
                           back to 0)
```

-continued

```
                       A0 = A0 +1 (increment Base
                           Address Register A0 to the
                           next word address)
                       then Go back to #2 to obtain
                           the next string A
                           character
          Yes: (null, end of string A, go to string B
               instructions below)
{Load first character of String B}
#3   LAQW (R1,A1),A2 (load arithmetic register A2 316
        with the value of the B string character
        pointed to by the word index A1 and the byte
        offset R1, or in the present example 044h)
#4   SAQW (R0,A0),A2 (move character in A2 to end of
        string A)
        Compare: Loaded value in A2 = Null? (null is
                 the end of string B)
          No:   (not end of string B, continue)
        {Set the pointers to the next character in
        string B}
                R1 = R1 + 1 (increment Index Register R1
                    312 to next byte)
                R1 >3? (incremented past a word
                        boundary?)
                  No: Go to #5 below
                  Yes: (adjust index and word address)
                       R1 = 0 (reset Index Register 312
                           back to 0)
                       A1 = A1 + 1 (increment Base
                           Address Register A1 to the
                           next word address)
#5   {Find the next destination location}
                R0 = R0 + 1 (increment Index
                    Register R0 308 to next byte)
                R0 >3? (incremented past a word
                        boundary?)
                  No:  Go to #4 above
                  Yes: (adjust index and word
                       address)
                       R0 = 0 (reset Index
                           Register A0 308 back
                           to 0)
                       A0 = A0 + 1 (increment
                           Base Address
                           Register A0 to the
                           next word address)
                       Go to #4 above
          Yes: (null, end of string B--completed)
```

As can be seen from the above code, a word address and an index value have to be maintained separately for each string being accessed. In an attempt to remedy this situation, a load string "LS" and a store string "SS" instruction have been developed to help simplify byte accessing by allowing auto-incrementation of an addressing index in an index register.

Figure 4A:
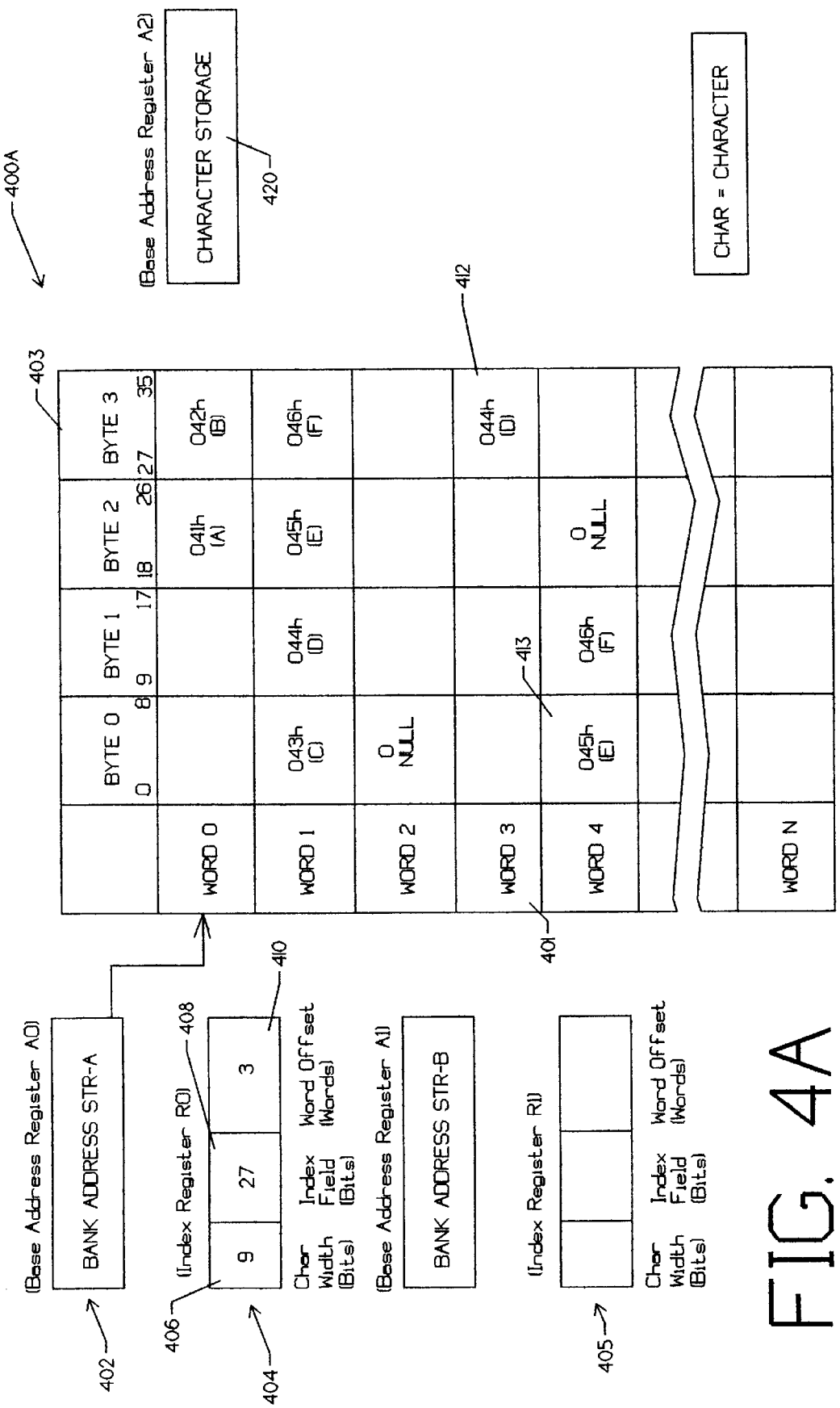
FIG. 4A is table 400A of byte columns and word rows indicating character locations prior to auto-indexing with associated registers.

FIG. 4A shows table 400A used by the LS and SS instructions having rows of words 401 and columns of characters 403, and also shows a Base Address register A0 402, an Index register 406, and an Arithmetic register A2 420. Base Address Register A0 402 points to a specific word in a bank of words, here word 0, and Index register R0 404 provide references to characters relative to the base address. Index Register R0 404 has a Character width field 406, which specifies the character width in bits, an Index field 408, which determines the character offset within a word, and a Word Offset field 410, which determines a word offset from the base address indicated by Base Address Register A0 402.

The data in the Base Address Register A0 is used in conjunction with the data in the Index Register R0 to generate a new address for accessing memory data on other than a word boundary. The new word address is generated by adding the word offset to the base address, then using the index field in bits, as the offset into the word to obtain the addressed character, with the character width the width specified in Character width field 406. In this example, the character width is 9 since four 8-bit ASCII words, with each word having a zero most significant bit, are stored in the 9-bit fields.

When using the LS or SS instructions in the auto-increment mode, the index field is incremented by the character width after each character reference. If this results in the index being incremented past a word boundary, the word offset is incremented by one, and the bit field is readjusted by subtracting 36, the 36-bit word length. These operations are provided automatically by the hardware with no additional instructions being required to carry out these operations.

Figure 4B:
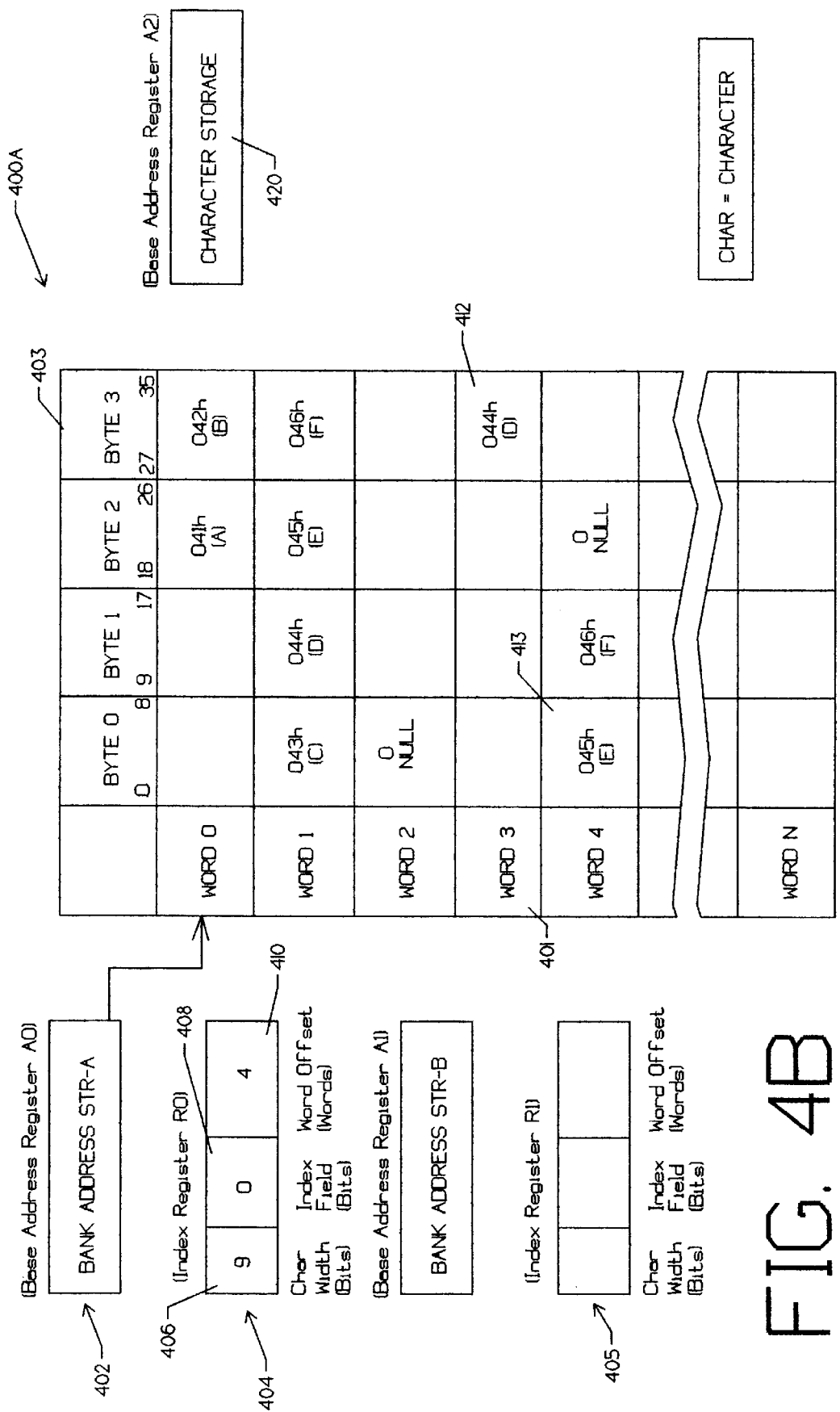
FIG. 4B is table 400B of byte columns and word rows indicating character locations after auto-indexing with associated registers.

FIG. 4B shows a table 400B, which indicates the results of carrying out the process on the contents of FIG. 4A and displaying the results in FIG. 4B. In both figures, Base Address register A0 402 points to word 0. In FIG. 4A, word 0 is offset 3 words by Word Offset field 410 of Index Register R0 404 to word 3. The character is offset 27 bits by Index Field 408 to Byte 3 with the character length being 9 bits as specified by Character width field 406 identifying Character 412 in word 3 row and byte 3 column.

FIG. 4B shows the results of automatically implementing the above described auto-incrementation operations as shown in FIG. 4A. Initially the index register is advanced by the character width of 9 bits. This causes a word boundary to be crossed since 27+9=36. This is greater than the maximum bit offset of 35 for a 36 bit word, therefore, 36 is subtracted resulting in Index field 408 being reset to 0 as shown in FIG. 4B. In addition, since a word boundary was crossed, Word Offset field 410 is incremented from 3 to 4 as shown in FIG. 4B. This locates Character 413 in word 4 row and byte 0 column. The length of the character remains at 9 bits.

With the auto-incrementation capability and with the LS/SS instructions available, the strcat (A,B) instruction can be compiled into the following pseudo code:

```
{First, find the end of String A as follows:}
Load Address of String A in Register A0
Set Index Register R0 404 Character Width field 406 to
    9, set the Index Field 408 to 18, and set the Word
    Offset field 410 to 0.
Set Index Register R1 405 Character Width field to
    9, set the Index Field to 27, and set the Word
    Offset field to 3.
#1  LS (R0,A0),A2 (load first character of string A
    from memory into the arithmetic register A2)
    Compare: Is the loaded value in A2 = null? (at end
    of string A?)
        No, go to #1
        Yes, the end of String A has been located so
        continue:
{Next move String B to the end of String A as follows:}
#2  LS (R1,A1),A2 (load first character of string B into
    the arithmetic register A2)
    Loaded value in A2 = null? (at end of string B?)
        No:   (not at end of string B)
              SS (R0,A0),A2 (move the character in A2 to
              the to end of string A)
              go To #2
        Yes:  (the end of string B has been located)
              SS (R0,A0),A2 (move the null character
              from A2 to the end of String A)
Done.
```

As is obvious from the above code, the LS and SS instructions reduce the amount of code necessary to do a strcat operation. There is still room for improvement, however. Even though the auto-incrementation eliminates the instructions previously required for incrementing the A0, A1, R0 and R1 values, the process of identifying the end of string A still requires two separate instructions for each byte in the string (e.g. the LS instruction and the compare instruction). Thus, two instruction cycles are used for each byte in the string. This represents a significant amount of processing time.

Test-Not-Equal String (TNES) and Test-Equal-String (TES) Instructions

The present invention provides TNES and TES instructions which load a character and perform a compare in a single instruction, rather than two instructions as described above. In an illustrative embodiment, this is accomplished by providing indexing apparatus which permits indexing on character boundaries, as described above. The characters are loaded from memory, and provided to an ALU unit in a processor, wherein a compare is made with a desired value. The ALU provides a compare result to a jump skip logic block, which notifies the processor whether the instruction immediately following the instruction of the present invention should be skipped or executed.

In a preferred embodiment, the TNES instruction skips the immediately following instruction if the character read from memory is not equal to the desired string or character. The TES instruction skips the immediately following instruction if the character read from memory is equal to the desired string or character. Both instructions load the appropriate character from memory, perform a compare of that loaded character with a desired value, and determine whether a skip should occur. In addition, both instructions are processed during a single instruction cycle.

The TNES and TES instructions load a word and select a byte from the word, as described above. An accumulator register, which is coupled to an ALU, may be provided and may be loaded with a desired result, for example a null or zero value. To align the selected byte with the desired result, it is contemplated that the selected byte may be right justified. This may be accomplished by using a shift register that has been adapted to provide the desired shifts. Depending on the byte offset and the character width, a conversion block directs the shift register to perform the appropriate shift operation to right justify the loaded character. This may occur after the selected character is loaded from memory but before the compare is made by the ALU.

The TNES and TES instructions use a Base Register, and refer to an index register and an accumulator register (e.g. A-REG 552). As described above, the index register preferably includes a character length field, a bit offset field and a word offset field. While a number of character lengths can be used by these instructions, which are integrally divisible into a word and are described later, the most useful length is a 9-bit byte. A 9-bit byte permits using an ASCII code of 8-bits plus a zero most significant bit (MSB) filler to provide the 9-bits. A character with a length of 9-bits divides integrally into the 36-bit word used in the illustrative processor. The operation of the TNES and TES instructions relative to the IP and the added elements provided by this invention is described in detail below. Further, the savings in the number of instructions required to perform a strcat instruction is illustrated in the pseudo code provided below.

TNES and TES Pseudo Code

Using the TNES and TES instructions, the strcat (A,B) instruction can be replaced with the following pseudo code, these instructions refer to FIGS. 4A and 4B. Here, registers A0 and A1 store the A and B character word address locations, respectively, and registers R0 and R1 provide the character field width in bytes, the index in bytes, and the offset in bytes for the A and B characters, respectively. A character is 9-bits in length for this example.

```
(First, find the end of string A as follows:)
    Load Address of String A in Register A0.
    Set Index Register R0 to the String A character width,
        index value, and word offset; in this case these
        are 18, 9 and 0 respectively.
    Load a compare value into A2, which in this case is the
        null character
#1  TNES (R0,A0),A2 (As long as this character is not null
        execute the next instruction which indexes to the
        next byte value and automatically resets the byte
        index value and advances the word count whenever a
        word boundary is passed. When the test finally
        fails, i.e. when the null character is located,
        this indicates that the end of string A has been
        located, then skip to the instruction following the
        next instruction.
    Go to #1 (Jump Instruction)
```

As can be seen from the above example, only a single instruction is executed for each byte in string A when loading and comparing each character to the null character. This may effectively increase the performance of performing such an operation by a factor of two over the prior methods. With reference to the above pseudo code, as long as the test performed by the TNES instruction is true, the instruction that follows the TNES instruction is executed. Otherwise, the instruction which follows the TNES instruction is skipped, and execution continues at the following instruction. By making the instruction which follows the TNES instruction a "jump" back to the TNES or TES instruction, a tight loop may be implemented which is only exited when the test instruction fails. This shows how the TNES instruction can be used to performed string operation more quickly than the prior art. The TES instruction operates in basically the same manner as the TNES instruction except that the TES instruction tests for an "equal" condition, rather than a "not equal" condition.

The TNES and TES instructions are particularly useful in searching character strings, which is commonly done during string processing. The following pseudo code completes the "strcat" example:

```
(Move string B to the end of string A as follows:)
    Decrement the character index field in register R0 to
        point to the null character, since the index was
        advanced past this character on the last LS
        instruction.
    Load Word Address of string B in Register A1
    Set Index Register R1 to the initial String B character
        width, index value, and word offset, which in this
        case is 9, 27 and 3, respectively.
#2  LS (R1,A1),A2 (load first character of string B into A2)
    Loaded value in A2 = null? (at end of string B?)
        No:  (not at end of string B)
             SS (R0,A0),A2 (move character in A2 to end of
                 string A)
             Go to #2
        Yes: (at end of string B)
             SS (R0,A0),A2 (move null character from A2 to the
                 end of String A)
Done.
```

Instruction Processor

The Instruction Processor (IP) illustrating the present invention uses the same arrangement as is typical in present word oriented data processors. Here, FJA fields are used to provide addressing functions. The "F" field provides the instruction. The "J" field provides a "per J" shifting value used to right justify the operand. The "A" field specifies which A register in a General Register Set (GRS) in the IP will be used.

Figure 5A:
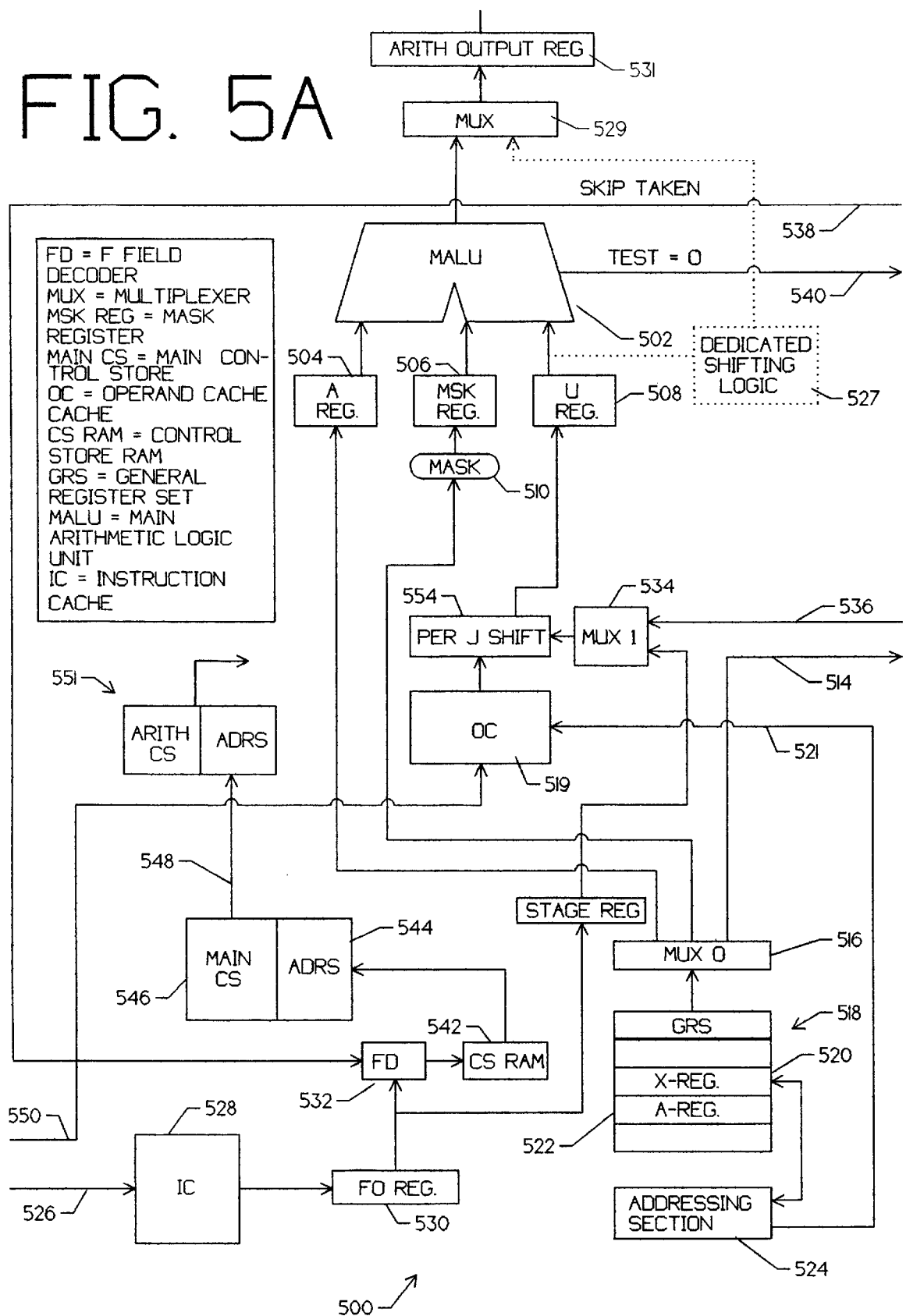
FIG. 5A is a block diagram of a conventional instruction processor with added elements for the present invention.
Figure 5B:
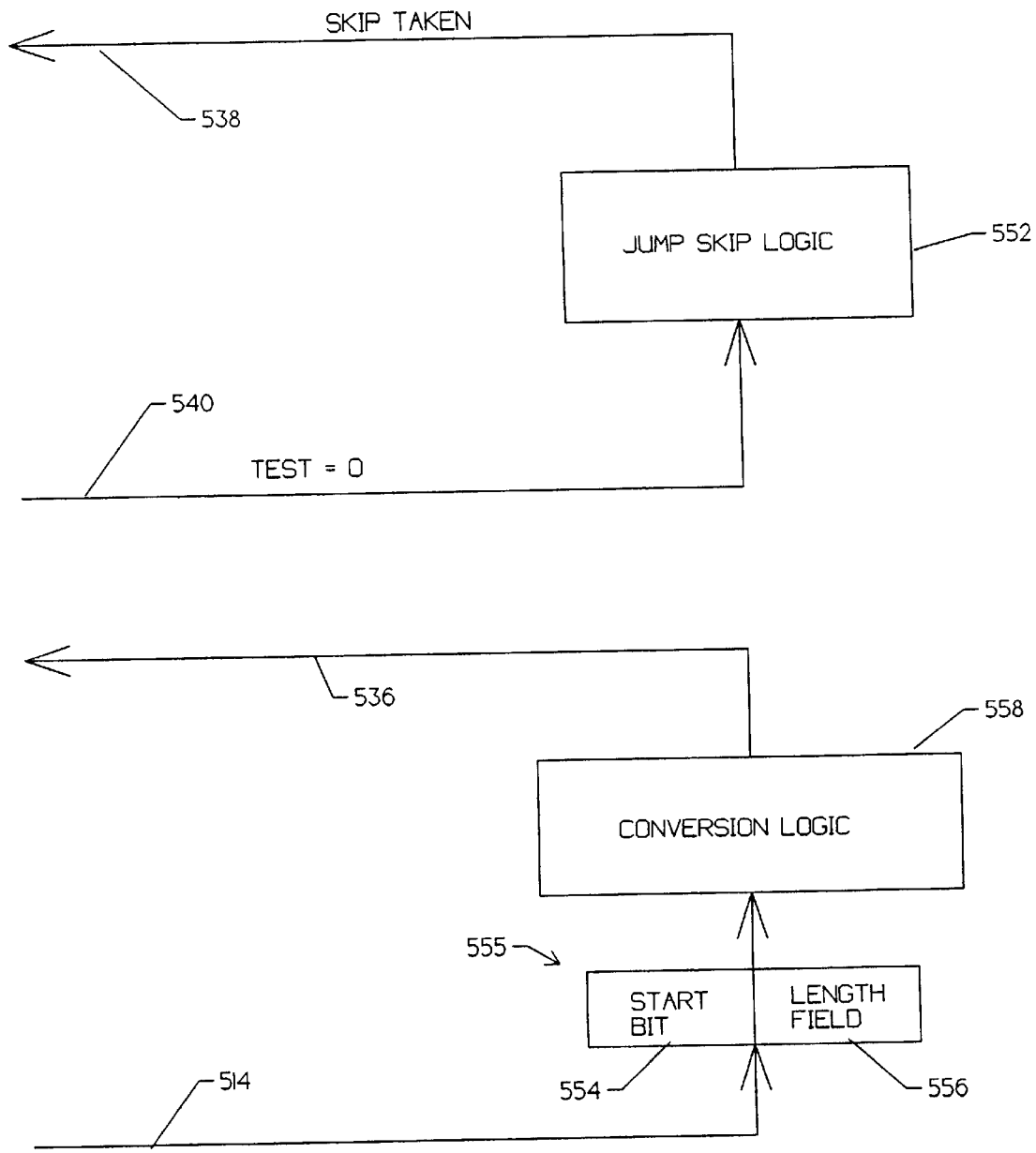
FIG. 5B is a block diagram of additional elements of the present invention which interface with elements of FIG. 5A.

FIG. 5A shows IP 400 including selected processing elements and connections typical of a word oriented data processing system. FIG. 5B shows additional elements that, in a preferred embodiment, are provided for the TNES and TES instructions and which interconnect with elements in FIG. 5A. U.S. patent application Ser. No. 08/777,517, (RA-3436) previously incorporated by reference, provides further information on the operations of IP 400.

Instruction Processor (IP) 500 has a Main Arithmetic Logic Unit (MALU) 502 with a connected A Register (REG) 504, a Mask Register (MSK REG) 506 and a U Register (REG) 508 providing operating information. MSK REG 506 is connected to Mask 510, which can mask off a selected portion of the input. In a preferred embodiment, this masking capability is not utilized during the execution of the TES and TNES instructions.

Inputs to A REG 504, Mask 510 and lines 514 to FIG. 5B are all connected to the output of Multiplexer (MUX) 0 516. The lines from MUX 0 516 to Mask 510 are for a "Non-TES Path", used for normal processing. MUX 0 516 multiplexes data in registers of General Register Set (GRS) 518 which includes an X-Register (X-REG) 520 and A-Registers (A-REGs) 522. Each register can hold 36 bits of data. Addressing Section 524 performs the X-REG incrementation on the value stored in the associated "X" registers in GRS 518. Addressing Section 524 is arranged to account for successive character calls by incrementing a character offset within a word, as described earlier, until the end of the word is reached, whereupon the character offset will be reset to zero and the word location incremented. Addressing section 524 then provides a resulting address to operand cache 519 via interface 521.

The instruction cache 528 is connected to F0 Register 530, which provides information to F Decoder 532 and to MUX 1 534. This information is staged to provide correct operation of the pipelined machine. MUX 1 534 also receives information over lines 536 from apparatus in FIG. 5B. Lines 538 from apparatus in FIG. 5B carries "Skip Taken" information to F0 decoder 532. Line 538 is enabled/disabled by MALU 502 depending upon whether an equal condition is detected.

Lines 540 carries the result of the compare operation from MALU 502 to the jump skip logic block 552 of FIG. 5B. Jump skip logic block 552 interprets the polarity of the result of the compare operation differently for the TES and TNES instruction.

CS RAM 542 receives data from F0 532, provides microcode to decode the F0 information, and outputs the decoded data to an Address (ADRS) portion 544 of Main Control Store (CS) 546. Main CS 546 provides timing and control for the IP 500 over lines 548 which carry parallel bits of information. Some of the lines 548 provide an address to the arithmetic microcode control store 551, which provides overall control to the arithmetic section. The arithmetic section includes the MALU 502, the Per J Shifter 554 and other arithmetic logic modules. The Operand Cache 552 and MUX 1 534 provide operand data, which is addresses by the addressing section 524, to PER J Shift 554, which controls shifting of data to the U REG 508.

TES and TNES control elements are shown in FIG. 5B. Line 540 provides input to Jump Shift Logic 552. As mentioned earlier, the state of line 540 is determined by the result of a Test=0 in MALU 502. The results of Test=0 determine the state of lines 540 and provide the input to Jump Skip Logic 552.

Lines 514 connect the output of MUX 0 516 to FIG. 5B, and provide the Start Bit Field 554 and Length Fields 556 from the contents of the X-REG. These fields are provided to Conversion Logic 558, which converts the string information to "Per J" information with the output on lines 536 being a MUX 1 534 input. When a TES or TNES instruction is being processed, the elements of FIG. 5B provide operative control as will be described later.

Normal Instruction Processing

Normal instruction processing, i.e., processing which does not involve TNES or TES processing, begins when an instruction is read from the instruction cache (IC) 528. From there the instruction is passed to the F0 REG 530, and is subsequently input to and decoded by the CS RAM 542. CS RAM 542 provides an address for the ADRS block 544 and for Main CS 546. Main CS 546 provides control signals for the IP 500 over lines 548. This includes such things as when the various registers are loaded, transfers between registers, and other processor operations. The arithmetic microcode store 551 is addressed by lines 548 provides similar control for the registers and muxes in the arithmetic section.

Operand cache data is provided by the operand cache (OC) 519. This information is provided to the Per J Shift 554 logic which shifts the operand data received from OC 552 according to the converted J value provided through lines 536. This results in the data transferred to U REG 508 being right justified as controlled by Per J Shift 554 logic (see FIG. 6). The A register 504 is loaded from GRS 518 with the value in the addressed A register during the TES and TNES instructions. The MASK register 506 may be loaded with all ones so that all bits are enabled for comparison in the MALU 502. The all ones pattern is provided by a constant generator block (not shown).

String Operations

The X register must first be set up with a "Load" instruction. The X register receives the Start Bit (SB) and the Field Length (L) which corresponds to the R0 register in the TNES/TES example. TNES and TES can use any character length less than one word in length, and preferably one that can be divided integrally into the word length, here 36-bits. Thus, preferable character field lengths are 4 bits, 6 bits, 9 bits, 12 bits, or 18 bits. While 4 bit and 12 bit character lengths could be used in this system, these size characters are not illustrated as they are not typical. The illustrative example here uses the 9-bit character length for the reasons described earlier.

A-REG 522 is set up with the compare character value that corresponds to register A2 in the TNES/TES example. In this case the compare value is the "NULL" ASCII value, i.e. a field of all zeros. The A0, A1, R0 and R1 values are loaded into General Register Set (GRS) registers 518. They are called up as required for the TES or TNES operations.

Either a TES or TNES instruction is loaded into the F0 REG 550 from IC 528. The X-REG 520 of GRS 518 has been previously loaded with the value which corresponds to register R0, the Start Bit and Length Field, of the TNES/TES example.

MUX 0 516 directs the information from X-REG 520 in GRS 518 over lines 514 to SB 554 and L Field 556 in FIG. 5B. This data is then transferred from SB 554 and L Field 556 to Conversion Logic 558. Conversion Logic 558 converts these fields to the normal Per J Shift values, and transfers them over lines 536 to MUX 1 534 in FIG. 5A. Some word oriented data processing systems use dedicated shifting hardware, as shown at 527, to performing the shifting operation during a load string instruction. The result is provided to a MUX 529 and eventually to an Arithmetic Output Register 531. In contrast, the present invention contemplates using the per J shift logic 554, which is used for many types of instructions, thereby reducing the size and power of the overall processor. The conversion block 558 makes the necessary conversion so that the standard Per J Shift block 554 can be used. The conversion provided, and the result of Per J Shift 554, for each character length, is explained further in the discussion relating to FIG. 6.

The operand data from OD 552 operand cache, based on the Per J information provided by Conversion Logic 558 is then loaded through Per J Shift logic 554, when MUX 1 536 selects line 536, into U Reg 508. The Per J shift results in the character being right justified in U Reg 508.

The compare is done in MALU 502. MALU 502 then indicates if the null character which is stored in A-register 504 (which is also loaded by the TES/TNES instruction with the null zero value from A-REG 522), is equal to the right-justified value in U REG 508 (which here may the current character from string A, for example). The Test=0 line 540 indicates the results, as either true or false. Line 540 provides this input to Jump Skip Logic 552 in FIG. 5B. Jump Skip Logic 552 sets Skip Taken line 540 depending upon the state of line 540 and whether a TES or TNES instruction is being performed. Skip Taken line 538 drives FD logic 532 in FIG. 5A which can force the logic to skip the next instruction. This corresponds to a finding that the character is a null as described in the TES example.

At the same time, the contents of the X-Register 520 in GRS 518 is incremented by adding the L field value to the SB field to obtain a new SB field value in Addressing Section 524. This system is based upon a 36-bit word length which, upon a 36 bit overflow, conceptually subtracts 36 bits from the SB field and increments A-Reg 522 which keeps the start bit within the 36-bit word range. This operation is preferably performed using a MOD-36 adder. Updated X-Register 520 is provided by Addressing Section 524.

This permits the code to increment through a string using string addressing only. This can not be done using normal FJA instructions, since merely incrementing the J field will not give the desired results. The new TNES and TES instructions are more efficient in that they allow testing to be performed immediately after being shifted on input by only a single instruction which is just one major cycle long.

Figure 6:
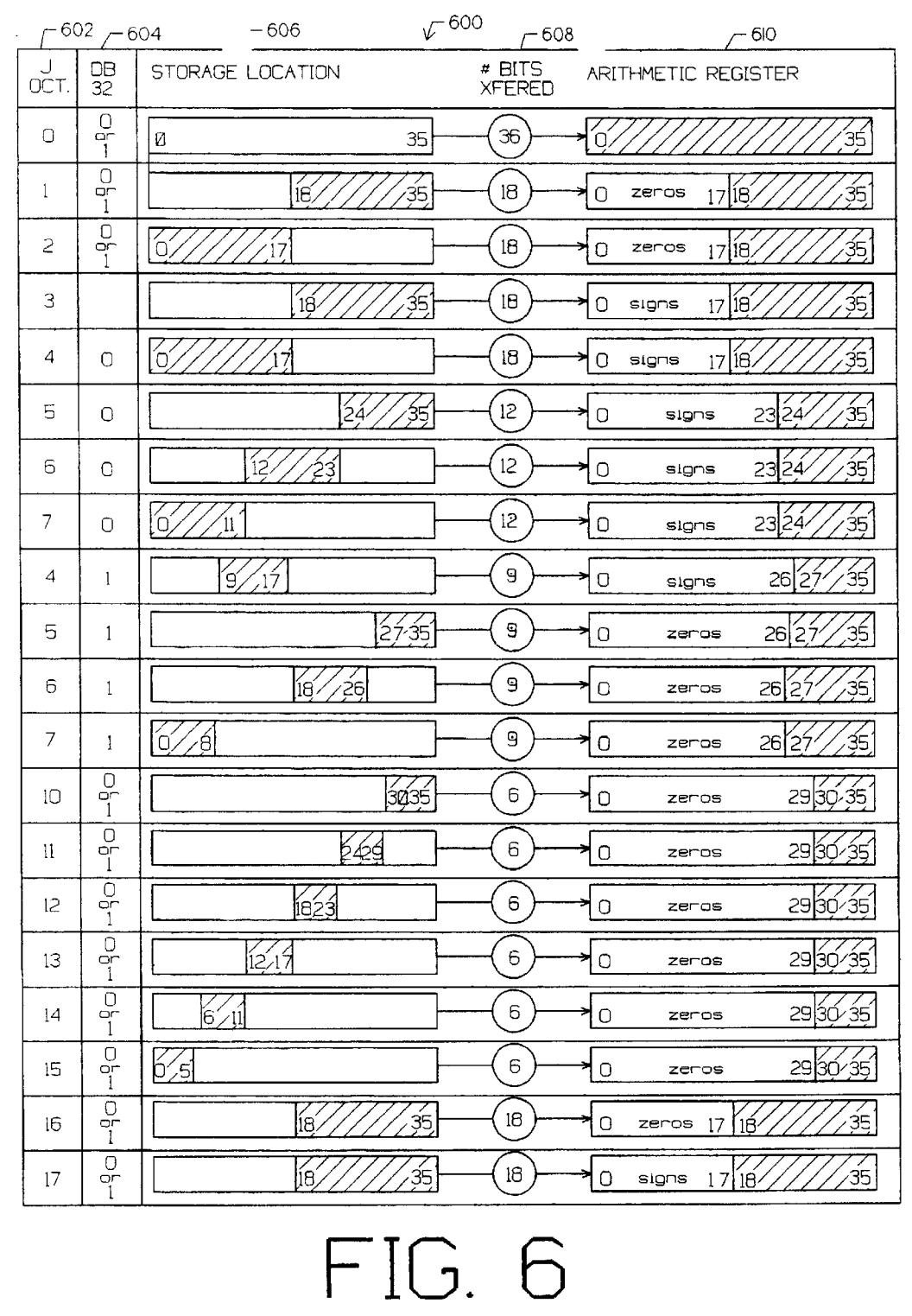

FIG. 6 indicates the J-field manipulations used in the TES and TNES instructions in table 600. The headings of the columns of table 600 are: J Octal (Oct) 602, DB 32 604, Storage Location 606, # of Bits Transferred (Xfer'd) 608, and Arithmetic Register 610. These define the J-Designator effect on storage to register instructions. J Octal 602 values and DB 32 604 values are provided by Conversion Logic 558 of FIG. 5B to Mux 1 534 on FIG. 5A over lines 536 and thence to Per J Shift 554 which regulates the shift of the data to U Reg 508. Bit locations indicated in Storage Location column 606 which are cross-hatched are the bits transferred, the number of bits being indicated in # of BITS XFER'D 608, with the transferred location being shown in the cross-hatched locations in Arithmetic Register 610.

As examples, a J value of 0 in column 602, and a DB32 value of either 0 or 1 in column 604 will provide a word extending from 0 to 35 bits, as indicated by the cross-hatched portion in Storage Location 606, these 36 bits will be transferred, as indicated by the number 36 within the circle in column 608, to column 610 where the word will extend from bits 0 to 36 as again indicated by the cross-hatched portion. A J value of 1 in column 602 and a DB32 value of either 0 or 1 in column 604 will provide a word extending from 18 to 35 bits, as indicated by the cross-hatched portion in Storage Location 606, these 18 bits will be transferred, as indicated by the number 18 within the circle in column 608, to column 610 where the word will extend from bits 18 to 36 as again indicated by the cross-hatched portion, with the portion from 0 to 17 not being cross-hatched and being filled with zeros. A J value of 2 in column 602 and a DB32 value of either 0 or 1 in column 604 will provide a word extending from 0 to 17 bits, as indicated by the cross-hatched portion in Storage Location 606, these 18 bits will be transferred, as indicated by the number 18 within the circle in column 608, to column 610 where the word will extend from bits 18 to 36, as again indicated by the cross-hatched portion, with the portion from 0 to 17 not being cross-hatched and being filled with zeros. A J value of 3 in column 602 and a DB32 value of either 0 or 1 in column 604 will provide a word extending from 18 to 35 bits, as indicated by the cross-hatched portion in Storage Location 606, these 18 bits will be transferred, as indicated by the number 18 within the circle in column 608, to column 610 where the word will extend from bits 18 to 36, as again indicated by the cross-hatched portion, with the portion from 0 to 17 not being cross-hatched and being filled with zeros. Skipping down column 602 to a J octal value of 5 and a DB 32 value of 1 will provide a word extending from 27 to 35 bits, as indicated by the cross-hatched portion in Storage Location 606, these 9 bits will be transferred, as indicated by the number 9 within the circle in column 608, to column 610 where the word will extend from bits 27 to 36, as again indicated by the cross-hatched portion, with the portion from 0 to 26 not being cross-hatched and being filled with zeros.

As can be seen from this figure word lengths of 36, 18, 12, 9 and 6 can be specified in Storage Location 606 in locations abutting each other, which can be transferred to Arithmetic Register 610 to abut against and extend to lower bit numbers from bit 35 such that the transferred lengths are right justified. The portions of Arithmetic Register 610 which do not contain the transferred word are always filled with either zeros or signs. The TES and TNES instructions preferably only use the cases that fill with zeros. This capability permits specifying word lengths, i.e., byte lengths of 6, 9, 12, and 18 bits.

Figure 7:
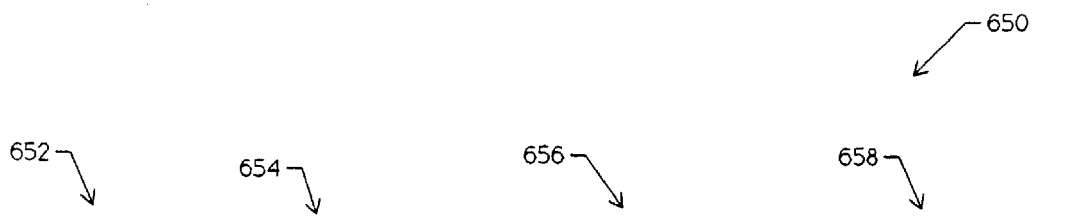
FIG. 7 is a table showing the preferred conversion performed by the conversion block of FIG. 5B to arrive at the J and DB32 values shown in FIG. 6.

FIG. 7 is a table showing the preferred conversion performed by the conversion block of FIG. 5B to arrive at the J and DB32 values shown in FIG. 6. The table is generally shown at 650, and includes a start bit column 652, a character length column 654, an equivalent "J" value column 656 and an equivalent DB32 column 658. As indicated with reference to FIG. 5B, the TES and TNES instructions provide a corresponding start bit value and a character length value to the conversion block 558. The conversion block 558 then provides a corresponding "J" value and a DB32 value, in accordance with the table shown in FIG. 7. The "J" value and the DB32 value control the Per J Shifter, which shifts the data in accordance with the table shown in FIG. 6.

Figure 8:
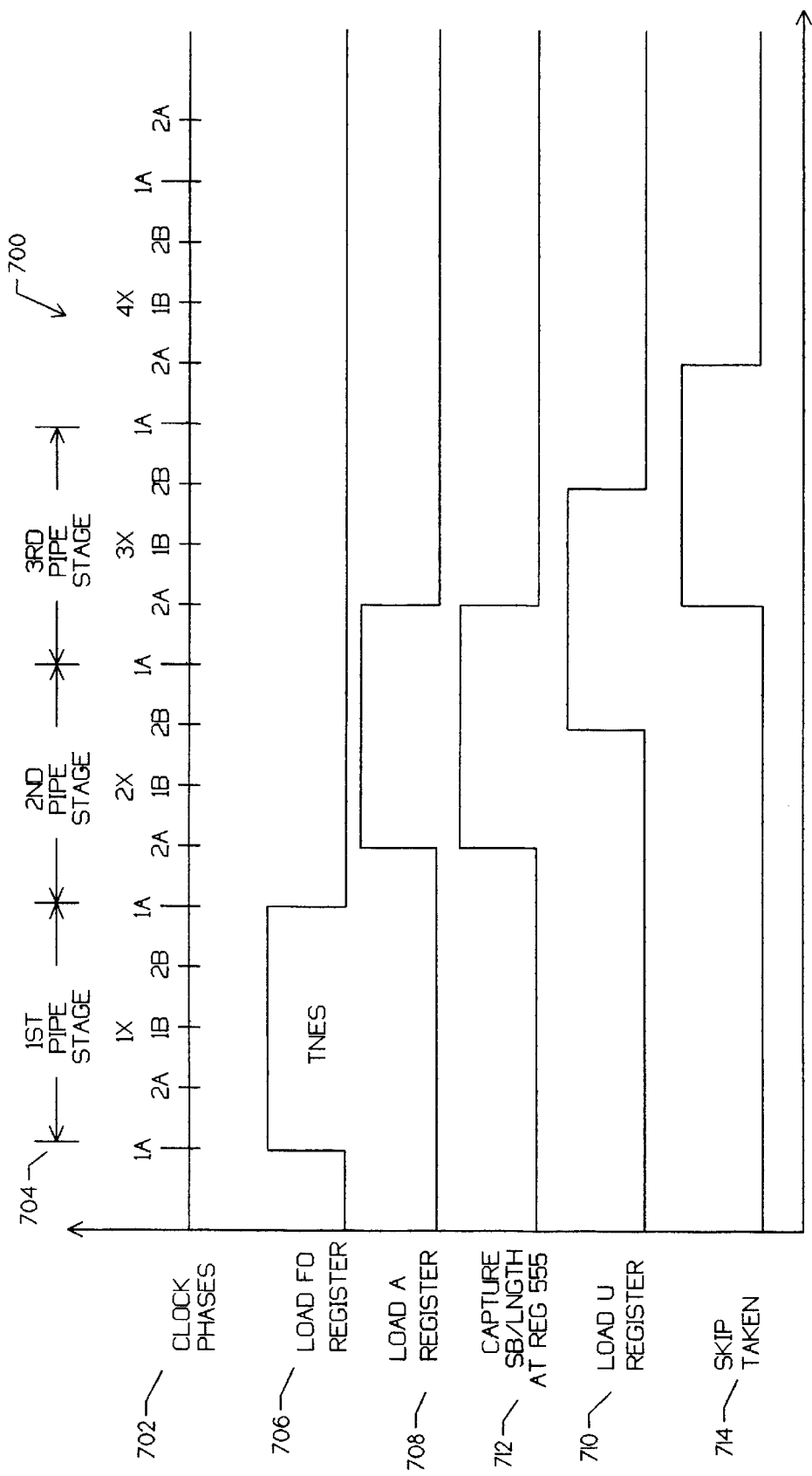
FIG. 8 is a timing chart showing the timing of various register operations.

An indication of the time required to perform the various steps involved in TNES and TES instructions as applied to components of FIG. 5A are shown in FIG. 8. Timing diagram 700 includes a clock sequence 702 with a major cycle 704 of 18.4 nanoseconds. Load F0 Register 706 shows the loading of F0 Register 530 from IC 528 at 1.0 major cycles. This loads either the TNES or TES instruction. Load A-REG 708 shows the loading of A-REG 504 at 2.25 major cycles. The start bit field and byte length field are captured at register 555 (see FIG. 5B) at the same time as shown at 712.

Load U register 710 shows the loading of U REG 508 at 2.75 major cycles. Skip Taken 714 shows the response of Jump Skip Logic 552 when Test=0 is valid on line 540 at 3.25 major cycles. These timing indications show the times of the response of these parts of the system relative to each other.

As can readily be seen, the TNES and TES instructions are completed in a single instruction cycle. In a preferred embodiment, and as shown in FIG. 8, the TNES and TES instructions may be executed on a pipelined instruction processor. In a pipelined instruction processor, the execution of each instruction is distributed over a number of pipeline stages, as shown. Each pipeline stage executes part of the instruction, and the results may be provided to a subsequent pipeline stage. To maximize performance, an instruction is often provided to the pipeline at each instruction cycle. Thus, a number of instructions are typically executed in parallel within the instruction pipeline, with each instruction at a different stage of execution. An advantage of a pipelined architecture is that each instruction may be executed over a number of clock cycles, but the effective rate at which the instructions are processed is one instruction per instruction cycle. As indicated above, and in the preferred embodiment, the TNES and TES instructions are completed in a single instruction cycle, and preferably on a pipelined instruction processor.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. An improvement for manipulating characters in a word oriented processor, wherein the word oriented processor executes a number of instructions, comprising:

a) loading means for loading a selected data segment from a memory having a word width, wherein the selected data segment corresponds to a selected byte and has a width that is less than the word width of the memory;

b) comparing means coupled to said loading means for comparing the selected data segment with a predetermined value wherein said loading means includes automatic byte addressing means for automatically addressing the selected byte and wherein said automatic byte addressing means includes an index register having a character width field, an index field and a word offset field: and a bank address register for storing an address of a selected memory bank within the memory and wherein said automatic byte addressing means includes dedicated hardware for incrementing the byte offset field by the character width: and for incrementing the word offset field by one and adjusting the byte offset field by subtracting the word width of the memory if the byte offset field is incremented past a word boundary; and c) instruction processor means coupled to said loading means and said comparing means for interpreting the number of instructions, the instruction processor means initiating said loading means and then said comparing means in response to a predetermined instruction.

2. Apparatus according to claim 1 wherein the word oriented processor includes an aligning means for aligning the selected data segment with the predetermined value.

3. Apparatus according to claim 2 wherein said aligning means includes a shift register adapted to provide a number of different shift operations, wherein the particular shift operation performed by said shift register is controlled by a number of control bits.

4. Apparatus according to claim 3 wherein said shift register is a Per J Shift Register, and wherein said Per J Shift Register is used by a number of instructions within the word oriented processor.

5. Apparatus according to 3 further including a conversion block for converting the byte offset field and the character width into a control word, wherein the control word is used to control which shift operation is performed by said shift register.

6. Apparatus according to claim 5 wherein said comparing comprising an ALU for performing the compare.

7. Apparatus according to claim 6 wherein said ALU provides a result value, wherein the result value indicates whether the selected data segment is equal to the predetermined value.

8. Apparatus according to claim 7 further including a jump skip logic block, wherein said jump skip logic block receives the result provided by said ALU, and notifies the word oriented processor to skip the next succeeding instruction following the predetermined instruction if the result value indicates that the selected data segment is equal to the predetermined value.

9. Apparatus according to claim 7 further including a jump skip logic block, wherein said jump skip logic block receives the result provided by said ALU, and notifies the word oriented processor to skip the next succeeding instruction following the predetermined instruction if the result value indicates that the selected data segment is no equal to the predetermined value.

10. A word oriented processor that executes a number of instructions, comprising:

a) a loading circuit for loading a selected data segment from a memory having a word width, wherein the selected data segment corresponds to a selected byte and wherein the selected data segment has a width that is less than the word width of the memory;

b) a comparing circuit coupled to said loading circuit for comparing the selected data segment with a predetermined value wherein said loading circuit includes an automatic byte addressing circuit for automatically addressing the selected byte wherein said automatic byte addressing circuit includes an index register having a character width field, an index field and a word offset field; and a bank address register for storing an address of a selected memory bank within the memory and wherein said automatic byte addressing circuit includes dedicated hardware for incrementing the byte offset field by the character width; and for incrementing the word offset field by one and adjusting the byte offset field by effectively subtracting the word width of the memory if the byte offset field is incremented past a word boundary; and c) an instruction processor circuit coupled to said loading circuit and said comparing circuit for interpreting the number of instructions, the instruction processor circuit initiating said loading circuit and then said comparing circuit in response to a predetermined instruction.

11. Apparatus according to claim 10 wherein the word oriented processor includes an aligning circuit for aligning the selected data segment with the predetermined value.

12. A method for manipulating characters in a word oriented processor, wherein the word oriented processor executes a number of instructions, the method comprising the steps of:

a) executing a single predetermined instruction within the word oriented processor, wherein said predetermined instruction causes said word oriented processor to perform the steps of:

i) loading a selected data segment from a memory having a word width, wherein the selected data segment corresponds to a selected byte and wherein the selected data segment has a width that is less than the word width of the memory and wherein said loading step includes the step of automatically addressing the selected byte and wherein said automatic addressing step includes incrementing a byte offset field by a character width; and incrementing a word offset field by one and adjusted the byte offset field by subtracting the word width of the memory if the byte offset field is incremented past a word boundary;

ii) comparing the selected data segment with a predetermined value;

iii) skip the instruction immediately following the predetermined instruction if the selected data segment is not equal to the predetermined value;

iv) skips the instruction immediately following predetermined instruction if the data segment is equal to the predetermined value.

13. A method according to claim 12 wherein the instruction immediately following the predetermined instruction is a jump instruction.

14. A method according to claim 12 further including the step of aligning the selected data segment with the predetermined value before the comparing step is performed.

15. A method according to claim 14 wherein said aligning step includes the steps of shifting the selected data segment in a predetermined manner.

16. A method according to claim 15 wherein said selected data segment is shifted so that it is right justified.

* * * * *